Jan. 15, 1963  F. A. GASPARINI  3,073,626
HOSE COUPLING FOR SUCTION CLEANING APPARATUS
Filed Dec. 22, 1958
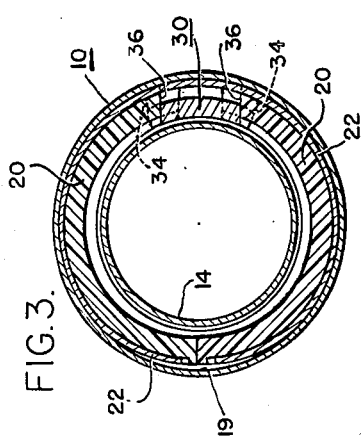
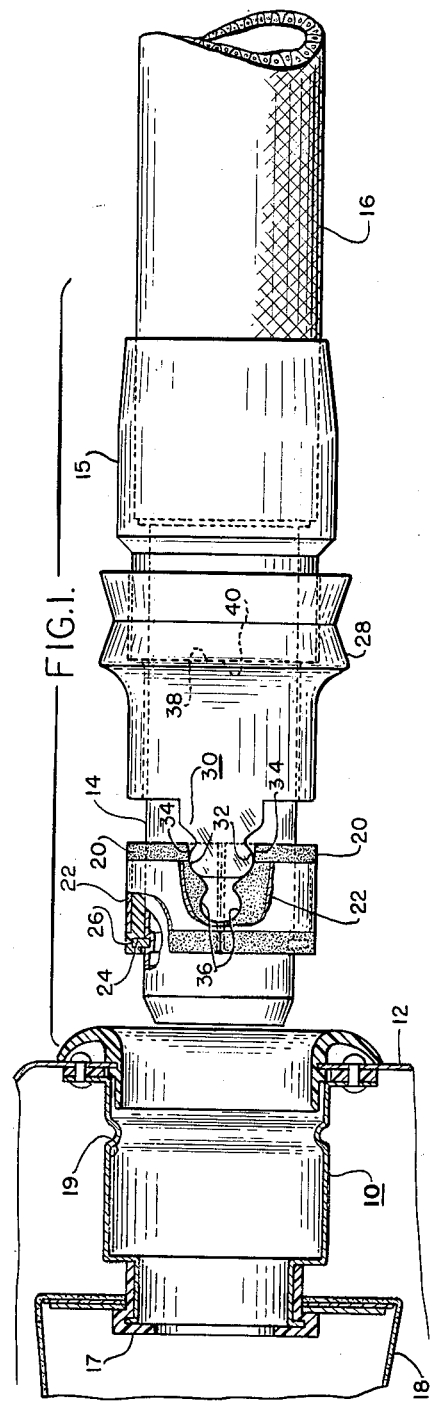
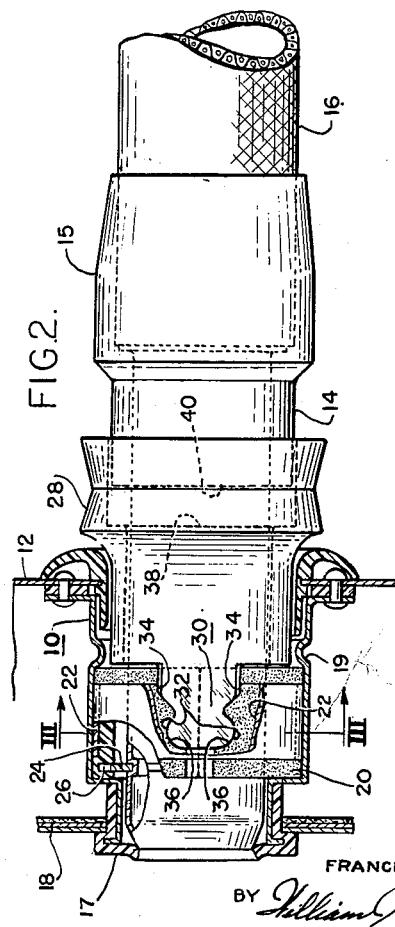
INVENTOR
FRANCIS A. GASPARINI
BY
ATTORNEY

United States Patent Office 3,073,626
Patented Jan. 15, 1963

3,073,626
HOSE COUPLING FOR SUCTION
CLEANING APPARATUS
Francis A. Gasparini, Springfield, Mass., assignor to Westinghouse Electric Corporation, East Pittsburgh, Pa., a corporation of Pennsylvania
Filed Dec. 22, 1958, Ser. No. 782,198
6 Claims. (Cl. 285—7)

This invention relates to a detachable hose coupling, and more particularly to a readily disconnectible coupling for attaching one end of an air conveying hose to a suction cleaner or similar apparatus.

Suction cleaners are ordinarily provided with attachment nozzles and brushes which are connected to the cleaner by an air conveying hose. It is desirable to provide a hose coupling which is readily attachable to and releasable from the cleaner; and which is freely rotatable, whereby twisting of the hose is eliminated. Furthermore, there are forces tending to separate the coupling parts because the hose is frequently used to pull the cleaner about the room, and the coupling must be able to transmit these forces to the cleaner without becoming released.

According to the present invention, male and female tubular members of the hose coupling are locked together against axial separation by means of a resilient split ring element. The ring element is carried by the male member and can be expanded into locking engagement with a registering annular groove in the female member by means of a movable wedge element disposed between and acting on spaced surfaces at the ends of the ring element. One surface of at least one element (either the ring element or the wedge element) is provided with at least two axially-spaced notches of unequal depth so that this element has oppositely facing surfaces that are alternately divergent and convergent with respect to each other along the line of wedge movement, and the other element is provided with at least one projection which extends transversely toward the notched surface. The arrangement is such that the ring element is contracted when the deeper of the two notches receives and grips the projection, and the ring element is expanded when the projection is received and gripped by the shallower of the two notches. The novel configuration of the facing wedge element and ring element surfaces prevents the coupled parts from being unlocked and separated unless there is positive axial movement of the wedge element. It is a feature of the present invention that the coupling set forth herein is both effective and inexpensive to manufacture.

The various objects, features and advantages of the invention will appear more fully from the detailed description which follows, taken in connection with the accompanying drawings, forming a part of this application, in which:

FIG. 1 is a view, partly in elevation and partly in vertical section, of a hose coupling embodying the invention. Separable parts are shown spaced from each other, in disconnected relation.

FIG. 2 is a view similar to FIG. 1, but showing the same parts coupled together.

FIG. 3 is a cross-sectional view taken along line III—III of FIG. 2.

The hose coupling embodying the invention includes a tubular female, or outer, member 10 disposed within and connected to an opening in a suction cleaner casing 12. Adapted to be telescopically received within the female member 10 is a tubular male, or inner, member 14 to which is connected an air conveying hose 16. A sleeve 15 covers the connection between the male member 14 and the hose 16. An air seal is established between the members 10 and 14 by means of a resilient membrane 17 which is carried by the female member 10 and disposed interiorly thereof. The membrane 17 is provided with a dilatable opening arranged to receive the outlet end of the male member 14. The membrane 17 also serves as the entrance to a foraminous bag, designated by the numeral 18. The bag 18 is suitably attached to the internal end of the female member 10 and serves to separate and collect dust from the dust-laden air passing therethrough.

The female member 10 has a concentric annular depression or groove 19 formed in the interior surface thereof and the male member 14 is equipped with a substantially encompassing, resiliently expansible, split ring 20 which, when contracted, permits the unimpeded insertion of the male member 14 into the female member 10. The groove 19 and ring 20 are arranged to register with each other when the male member 14 is received in the female member 10. Expansion of the ring 20 into the groove 19 is simply accomplished by wedging apart the ends of the ring 20, whereupon the members 10 and 14 are locked against axial separation.

The split ring 20 may be of unitary construction or, as in the preferred form shown, it may comprise two or more pieces made from moldable nylon, or other moldable, resilient material, in the interest of reducing manufacturing costs. When the ring 20 is constructed as preferred, however, a split annular band 22 of resilient metal, such as spring steel, is employed to hold the ring 20 together and provide additional and long-lasting resilience. The split band 22 is carried in an outwardly-facing, annular groove of the ring 20, where it is firmly held in position.

As best seen in FIG. 1, the ring 20 is restrained from movement lengthwise of the male member 14 by abutment means comprised of an annular retaining member 24 which is suitably anchored to the male member 14, on the exterior surface thereof, in a position where it can engage an inwardly facing annular groove 26 in the ring 20.

Also carried by the male member 14 is a grip annulus 28, which is disposesd between the split ring 20 and the hose 16 and is axially slidable therebetween. Extending axially from the grip annulus 28 toward the inserted end of the male member 14 is a wedge or actuator 30, the leading end of which is movable between the ends of the ring 20 when the grip annulus 28 is moved axially. The wedge 30 is provided at the leading end thereof with two cam-like projections 32 which extend transversely, in opposite directions, toward the spaced ends of the split ring 20. Each ring end surface, on the other hand, has two axially spaced notches 34 and 36 of unequal depth formed therein so that the ring ends are provided with follower surfaces that alternately diverge and converge with respect to each other along the line of movement of the wedge 30. The notches 34 are deeper than the notches 36; and notches of like depth are arranged in mutually facing pairs which are capable of receiving the projections 32. Stated another way, the notches 36 may be termed entry notches and the notches 34 may be termed reentry notches.

The arrangement is such that, when the projections 32 are in engagement with the deeper notches 34, the ring 20 is contracted. It is in this position that the inner or male member 14 can be inserted in or removed from the female member 10. To expand the ring 20, the projections 32 are moved into engagement with the shallower notches 36, which movement causes the ring ends to be moved apart by the camming action of the projections 32 on the follower surfaces.

Preferably, the shallower pair of notches 36 are disposed closer to the free or inserted end of the male member 14 so that insertion and locking are effected by a single continuous movement of the hand; that is, to attach the male member 14 to the female member 10, it is merely necessary to grasp the grip annulus 28 and push inwardly in the direction of insertion, whereby the male member is inserted in the female member and the coupling is locked. Conversely, unlocking of the hose coupling is accomplished by pulling on the grip annulus 28 in the direction of withdrawal of the male member 14. Thus, both insertion and locking, as well as unlocking and removal, of the male member 10 can be conveniently accomplished by continuous movements of the hand.

The locking action of the ring 20 is positive and there is no danger of the coupling being unlocked by strains imposed on the coupling, as by a pulling force (to the right as viewed in FIG. 2) exerted on the hose 16 in the normal operation of the suction cleaner. Such strains are transmitted in axial direction to the ring 20 from the hose 16 through the tubular male member 14 and the annular retaining member 24 and move the ring 20 into abutment with the right side of the groove 19.

Abutment surfaces 38 and 40 are respectively provided for the sleeve 15 and grip annulus 28 in order to limit axial movement of the wedge 30 between the ends of the ring 20, to the extent that the projections 32 are movable from a position of engagement with one pair of notches to the other. This provision prevents complete withdrawal of the wedge 30 from between the ring ends and, therefore, eliminates the inconvenience of having to twist the grip annulus 28 in search of an entrance between the ring ends for the wedge 30 prior to locking the coupling.

In locked position of the coupling, the hose 16 will not kink or twist when rotated, even though the ring 20 is in tight engagement with the groove 19, because the annular retaining member 24 rides smoothly on the exterior surface of the male member 14, as the latter rotates relative the ring 20, without binding or seizing. The coupling has the further advantage, therefore, of not requiring separate swivel connection elements.

While the invention has been shown in but one form, it will be obvious to those skilled in the art that it is not so limited, but is susceptible of various changes and modifications without departing from the spirit thereof.

What is claimed is:

1. In a releasable coupling, the combination of a tubular female member provided with an annular groove in the interior surface thereof, a male member receivable within said female member, a resilient split ring element substantially encompassing said male member and having spaced-apart surface portions at the ends thereof, said ring element being expansible into said groove when the ring ends are moved apart and said male member is received in said female member, means for preventing axial movement of said ring with respect to said male member, a wedge element carried by said male member for axial movement thereon, said wedge element having surface portions respectively facing said ring element surface portions, at least one of said surface portions of one of said elements having at least two axially spaced notches of unequal depth formed therein so that said surface portions of said one element are alternately divergent and convergent with respect to each other along the line of movement of said wedge element, the other of said elements being provided with a projection extending toward said one surface portion of said one element, at least one of said notches providing a circumferential distance between said surface portions of said one element permitting said ring element to be contracted when said projection is received by said one notch, a second of said notches providing a circumferential distance between said surface portions of said one element whereby said ring is expanded into locking engagement with said annular groove when said projection is received by said second notch, said projection and said second of said notches having inter-engaging means which releasably maintain said projection in said second of said notches, and means for limiting axial movement of said wedge element in the direction of withdrawal from said notches to the extent that said projection is at all times disposed at least partly between said surface portions of said one element.

2. In a releasable coupling, the combination of a tubular female member provided with an annular groove in the interior surface thereof, a male member receivable within said female member, a resilient split ring element substantially encompassing said male member and having spaced-apart surface portions at the ends thereof, said ring element being expansible into said groove when the ring ends are forced apart and said male member is received in said female member, means for preventing axial movement of said ring with respect to said male member, a wedge element carried by said male member for axial movement thereon, said wedge element having surface portions respectively facing said ring element surface portions, at least one of said surface portions of one of said elements being provided with an entry notch and a reentry notch which is spaced axially from said entry notch, the other of said elements being provided with a projection extending toward said one surface portion of said one element, said entry notch providing a circumferential distance between said surface portions of said one element permitting said ring element to be contracted when said projection is received by said entry notch, said re-entry notch providing a circumferential distance between said surface portions of said one element whereby said ring element is expanded into locking engagement with said annular groove when said projection is received by said re-entry notch, said projection and said re-entry notch having inter-engaging means which releasably maintain said projection in said re-entry notch, and means for limiting axial movement of said wedge element in the direction of withdrawal from said notches to the extent that said projection is at all times disposed at least partly between said surface portions.

3. In a releasable coupling, the combination of an outer tubular member provided with a concentric annular groove in the interior surface thereof, an inner tubular member telescopically receivable within said outer member, a resilient split ring element substantially encompassing said inner member and having spaced-apart surfaces at the ends thereof, said ring element being expansible into said groove when the ring ends are forced apart and said inner member is received in said outer member, said inner member having abutment means preventing axial movement of said ring with respect to said inner member, a wedge element carried by said inner member for axial movement thereon, at least a portion of said wedge element having surfaces respectively facing said ring element surfaces, at least one of said surfaces of one of said elements having at least two axially spaced notches of unequal depth formed therein so that said surfaces of said one element are alternately divergent and convergent with respect to each other along the line of movement of said wedge element, the other of said elements being provided with a projection extending toward said one surface of said one element, at least one of said notches providing a circumferential distance between said surfaces of said one element permitting said ring element to be contracted when said projection is received by said one notch, a second of said notches providing a circumferential distance between said surfaces of said one element whereby said ring element is expanded into locking engagement with said annular groove when said projection is received by said second notch, said projection and said second of said notches having inter-engaging means which releasably maintain said projection in said second of said notches, and means for limiting axial movement of said wedge element in the direction of withdrawal from said notches to the extent that said projection is at all times disposed at least partly between said surfaces of said one element.

4. In a releasable coupling, the combination of an outer tubular member provided with an annular depression in the interior surface thereof, an inner tubular member receivable within said outer member, a resilient split ring substantially encompassing said inner member and having spaced-apart follower surfaces at the ends thereof, said ring being expansible into said depression when the ring ends are biased apart and said inner member is received in said outer member, means preventing axial movement of said ring with respect to said inner member, a wedge carried by said inner member for axial movement thereon, at least a portion of said wedge having surfaces respectively facing said ring surfaces, at least one of said ring surfaces having at least two axially spaced notches of unequal depth formed therein so that said surfaces of said ring are alternately divergent and convergent with respect to each other along the line of movement of said wedge, said wedge being provided with a cam-like projection extending toward said one surface of said ring, at least one of said notches providing a circumferential distance between said ring surfaces permitting said ring to be contracted when said projection is received by said one notch, a second of said notches provdinig a circumferential distance between said ring surfaces whereby said ring is expanded into locking engagement with said annular depression when said projection is received by said second notch, said projection and said second of said notches having inter-engaging means which releasably maintain said projection in said second of said notches, and means for limiting axial movement of said wedge in the direction of withdrawal from said notches to the extent that said projection is at all times disposed at least partly between said ring surfaces..

5. In a releasable coupling, the combination of an outer tubular member provided with a concentric annular groove in the interior surface thereof, an inner tubular member telescopically receivable within said outer member through one end thereof, a resilient split ring substantially encompassing said inner member and having spaced-apart follower surfaces at the ends thereof, said ring being expansible into said groove when the ring ends are biased apart and said inner member is received in said outer member, said inner member having abutment means for preventing axial movement of said ring with respect to said inner member, a wedge carried by said inner member for axial movement thereon, at least a portion of said wedge having surfaces respectively facing said surfaces of said ring, each of said surfaces of said ring having at least two axially spaced notches of unequal depth formed therein so that said surfaces of said ring are alternately divergent and convergent with respect to each other along the line of movement of said wedge, each of said wedge surfaces being provided with a cam-like projection extending toward the respective facing surfaces of said ring, a first pair of said notches being oppositely disposed on said follower surfaces of said ring to provide a circumferential distance between said follower surfaces whereby said ring may be contracted when said wedge surfaces are received by said first pair of notches, a second pair of notches being oppositely disposed on said follower surfaces of said ring to provide a circumferential distance between said follower surfaces whereby said ring is expanded into locking engagement with said annular groove when said wedge surfaces are received by said second pair of notches, said wedge and said second pair of notches having inter-engaging means which releasably maintain said wedge in said second pair of notches, said inner member and said wedge having opposed, aligned abutment surfaces disposed to limit axial movement of said wedge in the direction of withdrawal from said notches to the extent that said projection is at all times disposed at least partly between said follower surfaces of said ring.

6. In a releasable coupling, the combination of an outer tubular member provided with an annular groove in the interior surface thereof, an inner tubular member, one end of said inner member being receivable within said outer member, a resilient split ring substantially encompassing said inner member adjacent said one end thereof, said ring being movable circumferentially relative to said inner member and having spaced-apart follower surfaces at the ends thereof, said ring being expansible into said groove when the ring ends are biased apart and said one end of said inner member is received in said outer member, said inner member having abutment means for preventing axial movement of said ring with respect to said inner member, a grip annulus carried by said inner member for relative axial and circumferential movement with respect thereto, said grip annulus having a wedge connected thereto which extends toward said one end of said inner member, said wedge being movable with said grip annulus and being provided with surfaces that respectively face said surfaces of said ring, each of said ring surfaces having at least two axially spaced notches of unequal depth formed therein so that said surfaces of said ring are alternately divergent and convergent with respect to each other along the line of movement of said wedge, each of said wedge surfaces being provided with a cam-like projection extending toward the respective facing surfaces of said ring, a first pair of said notches being oppositely disposed on said follower surfaces of said ring to provide a circumferential distance between said follower surfaces whereby said ring may be contracted when said wedge surfaces are received by said first pair of notches, a second pair of notches being oppositely disposed on said follower surfaces of said ring to provide a circumferential distance between said follower surfaces whereby said ring is expanded into locking engagement with said annular groove when said wedge surfaces are received by said second pair of notches, said wedge and said second pair of notches having inter-engaging means which releasably maintain said wedge in said second pair of notches, said inner member and said wedge having opposed, aligned abutment surfaces disposed to limit axial movement of said wedge in the direction of withdrawal from said notches to the extent that said projection is at all times disposed at least partly between said follower surfaces of said ring.

References Cited in the file of this patent

UNITED STATES PATENTS

| | | |
|---|---|---|
| 1,464,386 | Ingram | Aug. 7, 1923 |
| 1,949,027 | Pancoe | Feb. 27, 1934 |
| 2,828,147 | Peiffer | Mar. 25, 1958 |
| 2,899,215 | Ardito | Aug. 11, 1959 |
| 2,939,728 | Bitel | June 7, 1960 |